Jan. 20, 1959   E. A. MEYER ET AL   2,869,761
LIQUID INJECTOR
Filed April 27, 1955
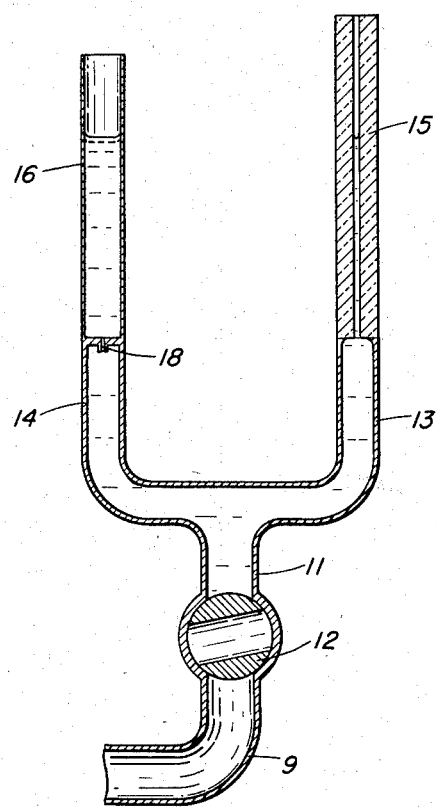
INVENTORS
EARL A. MEYER
MELVIN J. BINA
BY
Attorney 27
United States Patent Office 2,869,761
Patented Jan. 20, 1959

2,869,761

LIQUID INJECTOR

Earl A. Meyer, Madison, Wis., and Melvin J. Bina, Albuquerque, N. Mex., assignors to Bjorksten Research Laboratories, Inc., Madison, Wis., a corporation of Illinois Application April 27, 1955, Serial No. 504,226

2 Claims. (Cl. 222—158)

This invention relates to a method for dispensing small amounts of liquids and more specifically to an apparatus for introducing measured amounts of liquid into vacuum systems.

Heretofore, the injection of liquids into high vacuum systems has been a major problem especially where such an injection is accompanied by the presence of air which may be undesirable and therefore must be evacuated. Evacuation is a time consuming procedure, and in specific instances the presence of air may increase the danger of explosions.

In other vacuum systems, a graduated glass capillary tube may be used to dispense minute amounts of liquids. The glass capillary tube which has been filled is attached to a valve that regulates the amount of liquid which enters the system when the valve is opened. Disadvantages of this construction are manifold:

(1) The graduated tube must be refilled periodically and perhaps frequently, this being a time consuming process.

(2) Air may become trapped in the graduated tube during the refilling operation thereby upsetting the calibration of the capillary tube. It is believed that a solution to the problem is met in this invention.

An object of this invention is to provide an apparatus for dispensing minute amounts of liquid into various types of vacuum systems.

Another object is to provide a calibrated apparatus which is used for introducing minute amounts of liquids into various types of vacuum systems and eliminates the necessity of periodic and frequent refilling.

Another object is to provide a calibrated apparatus which dispenses minute amounts of liquids into various types of vacuum systems and which is characterized by a construction that eliminates the entrance of air into the vacuum system.

In the drawing, there is shown a diagrammatic elevation of the liquid-injecting apparatus. A hollow tube 16 characterized by a small orifice 18 constitutes a storage reservoir for the liquid. A graduated capillary tube 15 is used to measure the amount of liquid released by a liquid control valve 12. A Y-fitting connects the hollow tube 16, the graduated capillary tube 15 and the valve 12. The left hand connection of the Y-fitting links the hollow supply tube 16 with the common connection 11 of the Y-fitting. The right hand connection of the Y-fitting links the graduated capillary tube 15 with the common connection 11 of the Y-fitting. The common connection 11 links the left hand connection 14 and the right hand connection 13 with the intake side of the control valve 12. The outlet side 9 of the control valve 12 empties into the vacuum system.

The following apparatus exemplifies suitable dimensions for the construction, but in no way limits the scope of the invention. The inner diameter of the right hand connection and the left hand connection may be $\frac{1}{4}''$ in diameter. The common connection 11 may be $\frac{3}{8}''$ in diameter. The liquid supply tube 16 may be $\frac{5}{16}''$ O. D. x .025" wall x $2\frac{3}{16}''$ in length. The supply tube 16 may be constructed from glass or brass. It may be flared at the top in order to promote ease of filling. The capillary tube 15 may have an I. D. of 1.5 mm. and an O. D. of $\frac{5}{16}''$. It may be $2\frac{1}{2}''$ long. The details of the tube supports may be observed from the drawing.

The operation of the apparatus is as follows: When the supply tube 16 and the capillary tube 15 are filled and the control valve 12 is opened, liquid is drawn from the capillary tube 15 and the supply tube 16. The valve is opened for only a short period and because only a minor amount of liquid enters from the supply tube 16 due to the high impedance of the orifice 18, the amount of liquid which enters the Y-fitting may be measured as the amount withdrawn from the calibrated capillary tube. During the period when the valve is closed, the liquid from the supply tube 16 slowly passes through the orifice 18, gradually replenishing the liquid removed from the glass capillary 15. Air is not trapped in the apparatus since the replenishing occurs from the bottom of the glass capillary 15.

It is thus seen that our invention is broad in scope and is not to be restricted except by the claims, in which it is our intention to cover all novelty inherent in this invention as broadly as possible in view of the prior art.

Having thus disclosed our invention, we claim:

1. Apparatus for dispensing a small amount of liquid and determining the amount dispensed comprising a vessel having three hollow members extending therefrom, one of said members extending to a valve through which liquid is dispensed and the other two members extending upwardly from said vessel, one of said members being a transparent graduated tube having a small bore and the other of said members containing an orifice disposed between an upper portion thereof and a lower portion thereof and below the level of at least a substantial portion of said tube and being small in relation to the internal transverse dimensions of said tube, said upper portion having large internal transverse dimensions in relation to the internal transverse dimensions of said tube.

2. Apparatus for dispensing a small amount of liquid and determining the amount dispensed comprising a vessel having three hollow members extending therefrom, one of said members extending to a valve through which liquid is dispensed and the other two members extending vertically upward and parallel to each other, one of said members being a glass graduated tube having a small bore and the other being a tube having an upper portion and a lower portion, said portions joined by an orifice which is small in relation to the internal diameter of said graduated tube and being disposed below the level of at least a substantial portion of said graduated tube, said upper portion having a large internal diameter in relation to the internal diameter of said graduated tube.

References Cited in the file of this patent

UNITED STATES PATENTS

| | | |
|---|---|---|
| 672,492 | Pollatsek | Apr. 23, 1901 |
| 2,479,786 | Stevens | Aug. 23, 1949 |